US 9,370,861 B1

(12) United States Patent
Deprizio (10) Patent No.: US 9,370,861 B1
(45) Date of Patent: Jun. 21, 2016

(54) BARBECUE GRILL IMPLEMENT

(71) Applicant: David R. Deprizio, Olympia Fields, IL (US)

(72) Inventor: David R. Deprizio, Olympia Fields, IL (US)

( * ) Notice: Subject to any disclaimer, the term of this patent is extended or adjusted under 35 U.S.C. 154(b) by 0 days.

(21) Appl. No.: 14/121,705

(22) Filed: Oct. 10, 2014

(51) Int. Cl.
    *F24B 15/00* (2006.01)
    *B25J 1/04* (2006.01)
    *A47J 37/07* (2006.01)

(52) U.S. Cl.
    CPC ............... *B25J 1/04* (2013.01); *A47J 37/0786* (2013.01); *F24B 15/00* (2013.01)

(58) Field of Classification Search
    CPC ............ B25J 1/04; A47J 37/0786; F23J 1/04; F24B 15/00; F24B 15/10
    USPC .......... 294/1.5, 9–12, 14, 19.2, 175, 191, 209
    See application file for complete search history.

(56) References Cited

U.S. PATENT DOCUMENTS

| 272,472 | A | * | 2/1883 | Post | ............................. 16/434 |
| 1,751,337 | A | * | 3/1930 | Krisberg | ............................. 294/14 |
| 2,012,345 | A | * | 8/1935 | Mecuda | ............................. 294/11 |
| 3,113,799 | A | * | 12/1963 | Budnik | ......................... 294/31.2 |
| 3,520,569 | A | * | 7/1970 | Anderson | ...................... 294/19.2 |
| 4,310,189 | A | * | 1/1982 | Nihra | ............................ 294/19.2 |
| 5,553,905 | A | * | 9/1996 | Bentivegna | ...................... 294/24 |
| 6,260,896 | B1 | | 7/2001 | Dozier | |
| 7,108,304 | B2 | * | 9/2006 | White | ............................. 294/10 |
| 7,128,352 | B1 | * | 10/2006 | Phippen | ......................... 294/1.5 |

OTHER PUBLICATIONS

Amazon, "Soak Up Summer", Internet Web Page screen shot of Amazon communication about Patio, lawn and Garden products, at least as early as Jul. 2, 2014, pp. 1-2, USA.

* cited by examiner

*Primary Examiner* — Dean Kramer
(74) *Attorney, Agent, or Firm* — Paul Barenie, esq; Law Office of Paul Barenie (57) ABSTRACT

A method and implement for a barbecue grill are provided. The barbecue grill implement comprises a handle, and an extension portion coupled with the handle and including a first bend, and a second bend in the opposite direction of the first bend. The extension portion may include first, second and third extension portion segments having respective lengths '11', '12' and '13', where '11' is greater than each of '12' and '13'. A raking head extends from the extension portion, the raking head having a geometric perimeter with a substantially central opening. The raking head may have a pentagon-shaped perimeter. The barbecue grill implement is inserted in the barbecue, and moved along the charcoal grate. Charcoal is captured at the raking head, and the charcoal is relocated.

15 Claims, 5 Drawing Sheets

BARBECUE GRILL IMPLEMENT

TECHNICAL FIELD

This disclosure is directed to a barbecue grill, and more particularly, to an implement for moving charcoal in a barbeque grill.

BACKGROUND ART

Barbecues utilize a heat source such as charcoal briquettes or other charcoal wood product to heat food items. Such barbecues typically include a kettle, a charcoal grate for holding the charcoal, and a cooking grate above the charcoal grate on which the food is placed.

Often, during the process of cooking food on a barbecue, it is desired to relocate charcoals on the charcoal grate. Such relocation of charcoals may be to alter the heat pattern of the barbecue. Such relocation of charcoal may also, or in the alternative, be desired to allow the addition of charcoal to the barbecue where coals are burning-out, or where additional heat is desired for cooking.

Conventional tools for relocating charcoal comprise a straight member with a hoe or hook at the end. The tool is inserted through an opening in the cooking grate designed for adding charcoal to the barbecue. After insertion, charcoal may be relocated using the hoe or hook end of the tool. However, such tools are limited in their ability to reach charcoal at various locations of the charcoal grate, requiring lifting or removal of the food grate in order to relocate the charcoal. Such lifting and removal of the food grate risks dumping or otherwise displacing food placed thereon. Further, placement of such charcoal relocating tools through the opening in the grate to move the charcoal places the users hands substantially above the barbecue, exposing the user's hand to the potentially dangerous heat emanating from the barbecue.

This invention is directed to solving one or more of the problems listed above.

SUMMARY

A barbecue grill implement comprises a handle and an extension portion coupled with the handle, including a first bend and a second bend in the opposite direction of the first bend. A raking head is coupled with the extension portion, the raking head having a pentagon-shaped perimeter with substantially central opening.

In one embodiment, the extension portion and the raking head are formed from metal rod. In a further embodiment, the extension portion and the raking head are formed from a single piece of metal rod.

In another embodiment, the raking head having a pentagon-shaped perimeter includes the raking head having a discontinuous geometric pentagon-shaped perimeter.

In another embodiment, the first bend has a first bend angle and the second bend has a second bend angle, and the extension portion having a second bend in the opposite direction of the first bend includes the second bend angle being substantially the same as but in the opposite direction as the first bend angle.

In another aspect of the invention, a barbecue grill implement comprises a handle, and an extension portion coupled with the handle having a first bend of at least forty-five degrees, and a second bend of at least forty-five degrees in an opposite direction of the first bend. A raking head is coupled with the extension portion at an end opposite the handle, the raking head having a geometric perimeter with a substantially central opening. The extension portion of this aspect includes a first extension portion segment between the handle and the first bend having a length 'l1', a second extension portion segment between the first bend and the second bend having a length 'l2', and a third extension portion segment between the second bend and the raking head having a length 'l3', where 'l1' is greater than each of 'l2' and 'l3'.

In one embodiment of this aspect, the extension portion and the raking head are formed from a single piece of metal rod. In a further embodiment, the raking head having a geometric perimeter includes the raking head having a polygon perimeter.

In another embodiment of this aspect, the raking head having a geometric perimeter includes the raking head having a polygon perimeter. In another embodiment, the raking head having a geometric perimeter includes the raking head having a circular perimeter.

In another embodiment, 'l2' is greater than 'l3'.

In an additional embodiment, the third extension portion segment is substantially parallel with the first extension portion segment.

In another aspect, a method of spreading charcoal in a barbecue, the barbecue having a charcoal grate, charcoal resting on the charcoal grate is provided. The method comprises inserting a barbeque grill implement in the barbecue, the barbecue grill implement having a handle, an extension portion coupled with the handle and including a first bend of at least 45 degrees, and a second bend of at least 45 degrees in the opposite direction of the first bend, where the extension portion includes a first extension portion segment between the handle and the first bend and having a length 'l1', a second extension portion segment between the first bend and the second bend and having a length 'l2', and a third extension portion segment between the second bend and the raking head and having a third length 'l3', and where 'l1' is greater than each of 'l2' and 'l3', and a raking head is coupled with the extension portion, the raking head having a geometric perimeter with a substantially central opening. The barbecue implement is moved along the charcoal grate. Charcoal is captured at the barbecue grill implement. The charcoal is relocated.

In an embodiment of this aspect, where the barbecue grill includes a cooking grate suspended over the charcoal, the inserting a barbecue grill implement includes inserting the barbecue grill implement through an opening in the cooking grate.

In another embodiment where the barbecue grill includes a cooking grate suspended over the charcoal, the moving the barbecue grill implement along the charcoal grate includes moving the barbecue grill implement beneath the cooking grate.

DETAILED DESCRIPTION OF THE PREFERRED EMBODIMENT

A barbecue grill implement and method comprises a handle and an extension portion coupled with the handle, including a first bend and a second bend in the opposite direction of the first bend. A raking head is coupled with the extension portion, the raking head having a geometric perimeter with a substantially central opening. The barbecue grill implement is inserted through an opening in a cooking grate, and moved along the charcoal grate. Charcoal is captured at the raking head, and the charcoal is relocated.

Various figures will be discussed to describe embodiments of the invention. One skilled in the art will realize that these figures may not necessarily be to scale. For the purpose of simplicity, not all reference numbers are shown in every figure.

Figure 1:
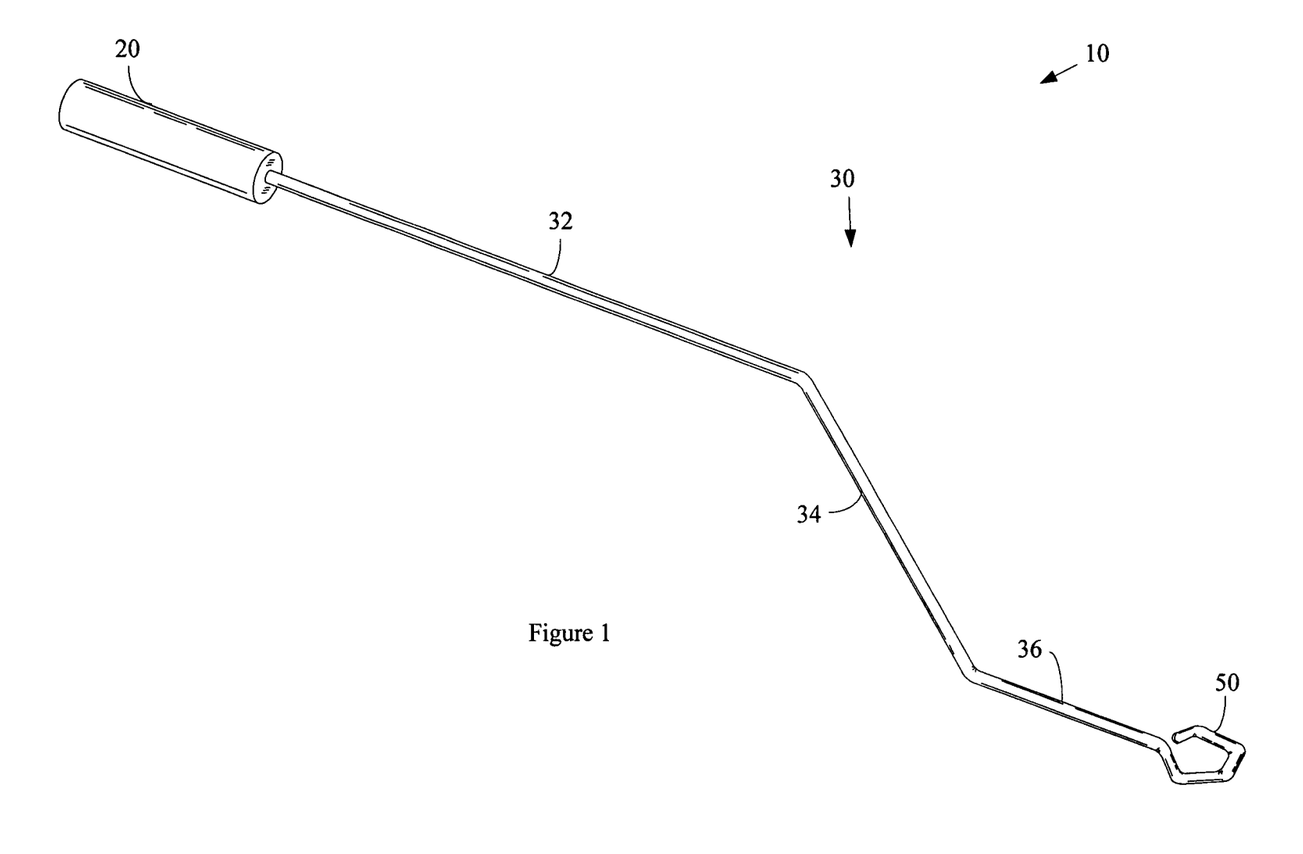
FIG. 1 is a perspective view of a barbecue grill implement in accordance with an embodiment of the invention.
Figure 2:
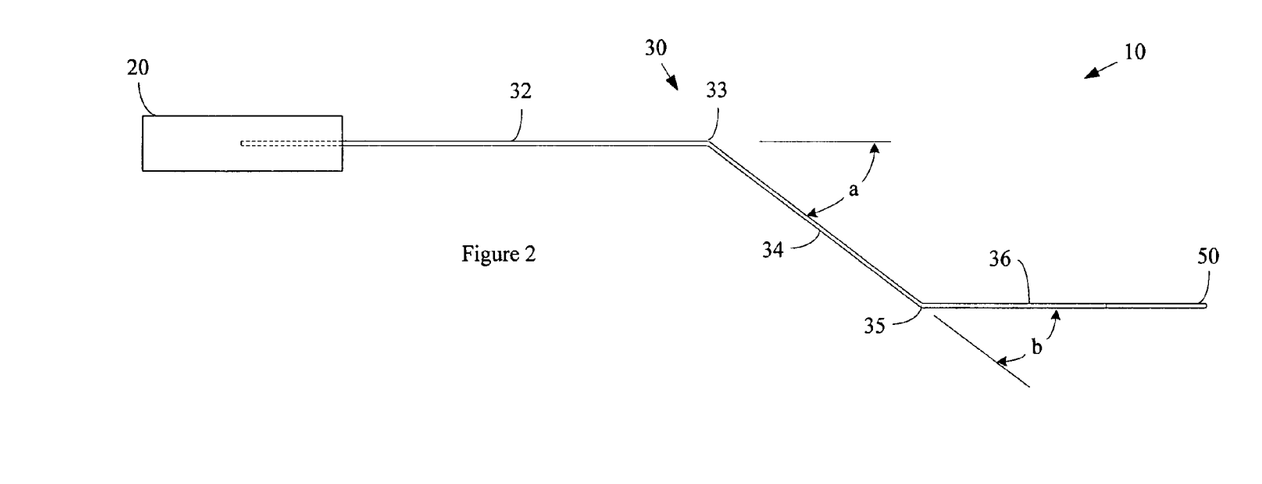
FIG. 2 is a side view of the barbecue grill implement of FIG. 1 in accordance with an embodiment of the invention.
Figure 3:
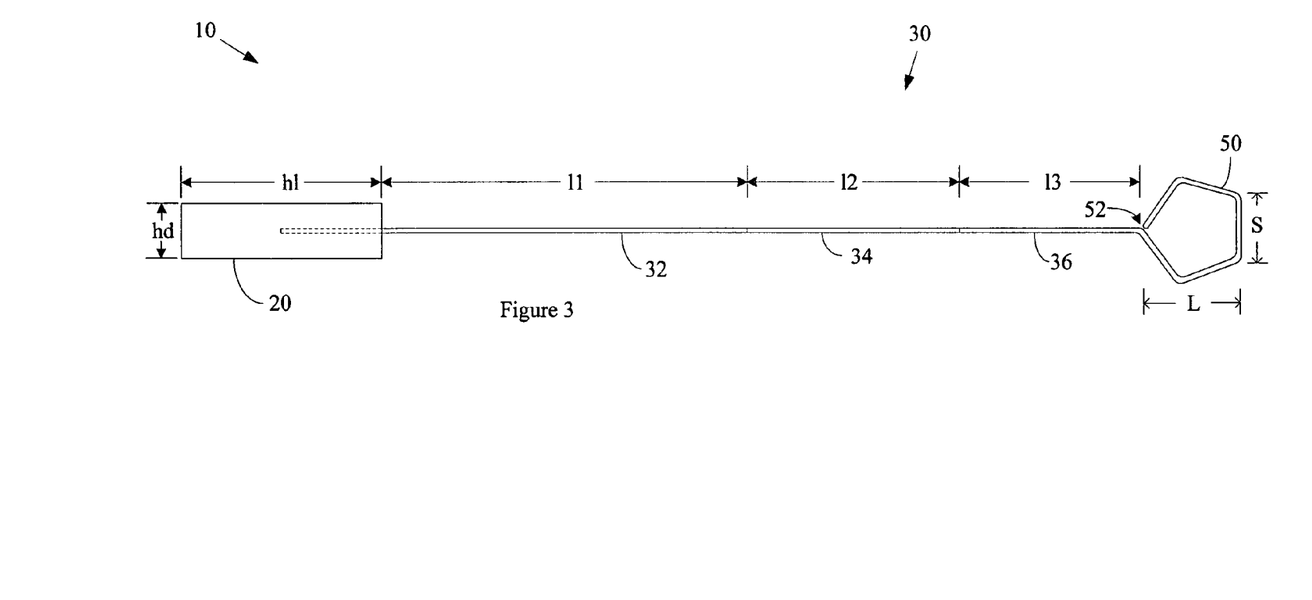
FIG. 3 is a top view of the barbecue grill implement of FIG. 1 in accordance with an embodiment of the invention.

FIG. 1 is a perspective view of a barbecue grill implement in accordance with an embodiment of the invention. FIGS. 2 and 3 are side and top views, respectively, of the barbecue grill implement of FIG. 1, in accordance with an embodiment of the invention.

Referring to FIGS. 1-3, a barbecue grill implement 10 includes a handle 20, an extension portion shown at 30 extending from the handle 10, and a raking head 50 coupled with the extension portion. The extension portion includes a first bend 33 and a second bend 35 substantially in the opposite direction of the first bend. The extension portion 30 further includes a first extension portion segment 32 between the handle 10 and the first bend 33, a second extension portion segment 34 between the first bend 33 and the second bend 35, and a third extension portion segment between the second bend 35 and the raking head 50.

The first extension segment 32 has a length 'l1', the second extension segment 34 has a length 'l2', and the third extension segment 36 has a length 'l3'. The first bend 33 has a first bend angle of 'a' degrees, and the second bend 35 has a second bend angle of 'b' degrees substantially in the opposite direction of the first bend 33.

The handle 20 may be formed from wood, plastic, metal, resin, or any other material sufficient for supporting a coupling with the extension portion 30, and where desired, capable of insulating a user's hand from heat transferred through the extension portion 30. For example, the handle 20 may be made from hickory wood, having a handle length 'hl' of approximately 6 inches, and a handle diameter 'hd' of approximately 1⅜ inches. The handle 10 may have a central bore, for example, along its longitudinal axis, for receiving the extension portion 20. Such bore may be any length and diameter sufficient for receiving and supporting the extension portion. For example, the bore may be approximately 2 inches long allowing the extension portion 30 to be seated within the handle 20. The bore need not be centered.

The extension portion 30 may be made from any material capable of withstanding the heat from the barbecue. For example, the extension portion 30 may be formed from ¼ inch diameter stainless steel No. 304 rod that is compliant with food handling applications.

The raking head 50 may be formed from any material capable of withstanding the heat from the barbecue. For example, the raking head 50 may be formed from % inch diameter stainless steel No. 304 rod that is compliant with food handling applications.

As shown at FIGS. 1-3, the extension portion 30 and the raking head 50 may be formed form a single piece of material, for example, ¼ inch diameter stainless steel No. 304 metal rod.

As shown in FIGS. 1-3, the raking head 50 may have a geometric perimeter with a substantially central opening, for example, a polygon perimeter of a pentagon, as shown. As further shown, the raking head 50 may be discontinuous, having a gap shown at 52.

Figure 4A:
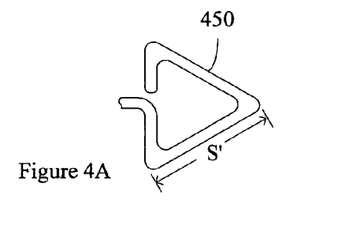
FIGS. 4A-4D are various configurations for the raking head in accordance with various embodiments of the invention.
Figure 4B:
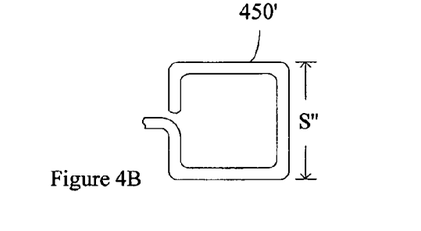
Figure 4C:
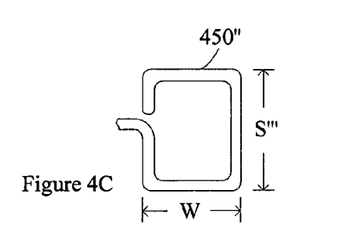
Figure 4D:
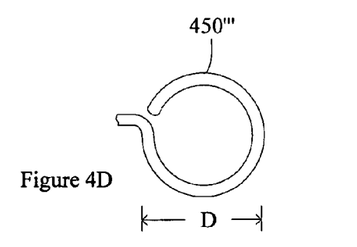

Referring to additional embodiments of FIGS. 4A-4D, the raking head 50 may have other geometrically-shaped perimeters, for example, a triangular raking head 450 perimeter (FIG. 4A), a square raking head 450' perimeter (FIG. 4B), a rectangular raking head 450" perimeter (FIG. 4C), or a circular raking head 450''' perimeter (FIG. 4D). Other geometrically-shaped perimeters may be utilized.

Returning back to FIGS. 1-3, in this embodiment, the extension portion has a first extension segment 32 with 'l1' being approximately 11 inches, a second extension portion 34 with 'l2' being approximately 8 inches, and a third extension portion 36 with 'l3' being approximately 5¼ inches. Other dimensions may be utilized. The lengths 'l1', 'l2' and 'l3' as well as angles 'a' and 'b' may be selected accounting for the style and contour of the barbecue being used (i.e., kettle grill, rectangular grill, etc. . . . ), as well as the distance between the cooking grate and charcoal grate, and the particular dimensions of the charcoal grate and reach along the charcoal grate desired. Thus, 'l1' may be determined and increased, where it is desired for a user to be further from the barbecue. 'l2' may be determined considering the distance between the cooking grate and charcoal grate. 'l3' may account for the dimensions of the charcoal grate, and increased to provide greater reach for larger grates. The angles 'a' and 'b' may be selected to account for the contour of the barbecue grill. The angles 'a' and 'b' may be selected sufficiently to allow the barbecue grill implement to be inserted into the grill and travel along the charcoal grate (and where a cooking grate is provided, between the charcoal grate and cooking grate). Thus, the generally opposing angles 'a' and 'b' may have different values.

In this embodiment, the first bend angle 'a' may be approximately 60 degrees, and the second bend angle 'b' may be approximately 60 degrees in the opposite direction from the first bend angle. Thus, in this embodiment, the first extension segment 32 and the third extension segment 36 are substantially parallel.

The raking head 50 may have a pentagonal side length 'S' of approximately 2 inches, and a length 'L' of approximately 3 inches extending from the extension portion 30. In other embodiments, and referring to FIGS. 4A-4D, the raking head 450 may have a side length 'S' of 3 inches (FIG. 4A), the raking head 450' may have a side length 'S''' of 2 inches (FIG. 4B), the raking head 450" may have a side length 'S''''' of 3 inches and width 'W' of 2 inches (FIG. 4C), and the raking head 450''' may have a diameter 'D' of 2 inches (FIG. 4D). Other side lengths, widths and diameters may be utilized, and may be sized sufficiently for lifting, pushing, sweeping, or otherwise being capable of relocating a piece of charcoal or charcoal briquette.

The first bend 33 may allow a user of the barbecue grill implement 10 to use the implement from a side of the barbecue, outside the zone of heat emanating from the barbecue. The length 'l1' of the first extension segment 32 provides distance between the user and the barbecue, further protecting the user from the heat emanating from the barbecue. The second bend 35 allows the raking head 50 to travel along a charcoal grate for the capture and relocation of charcoal by the barbecue grill implement 10 (discussed below). The length 'l2' of the second extension segment 34 allows the barbecue grill implement 10 to reach through a food grate of a barbecue, down to the charcoal grate and the charcoal (or where no charcoal grate is used, down to the bottom of a kettle or other container holding the charcoal). The length 'l3' of the third extension segment 36 of the barbecue grill implement 10 allows for further reach of the raking head 50 along the charcoal grate, for lifting, pushing, sweeping, or otherwise arranging or relocating charcoal within the barbecue.

Figure 5:
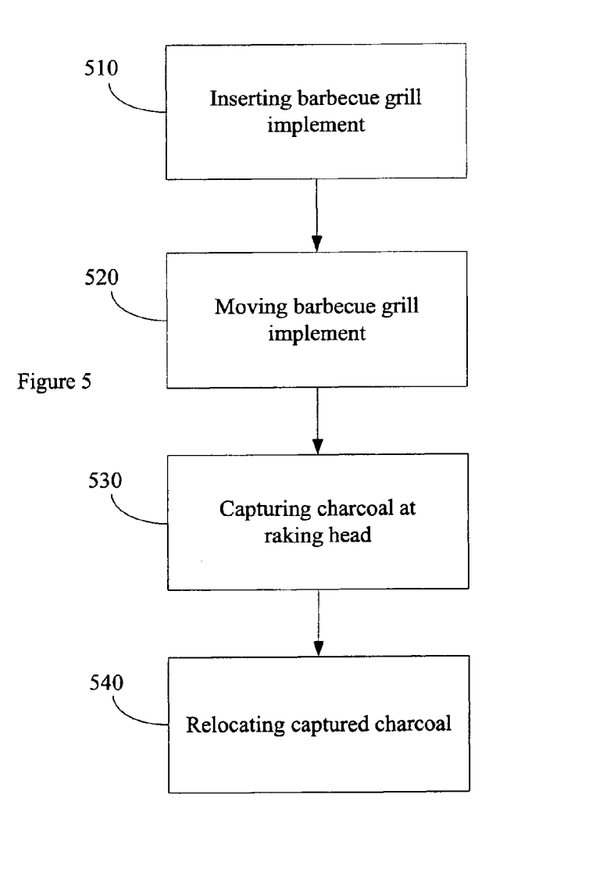
FIG. 5 is a flowchart illustrating operation of the barbecue grill implement of FIG. 1 in accordance with an embodiment of the invention.
Figure 6A:
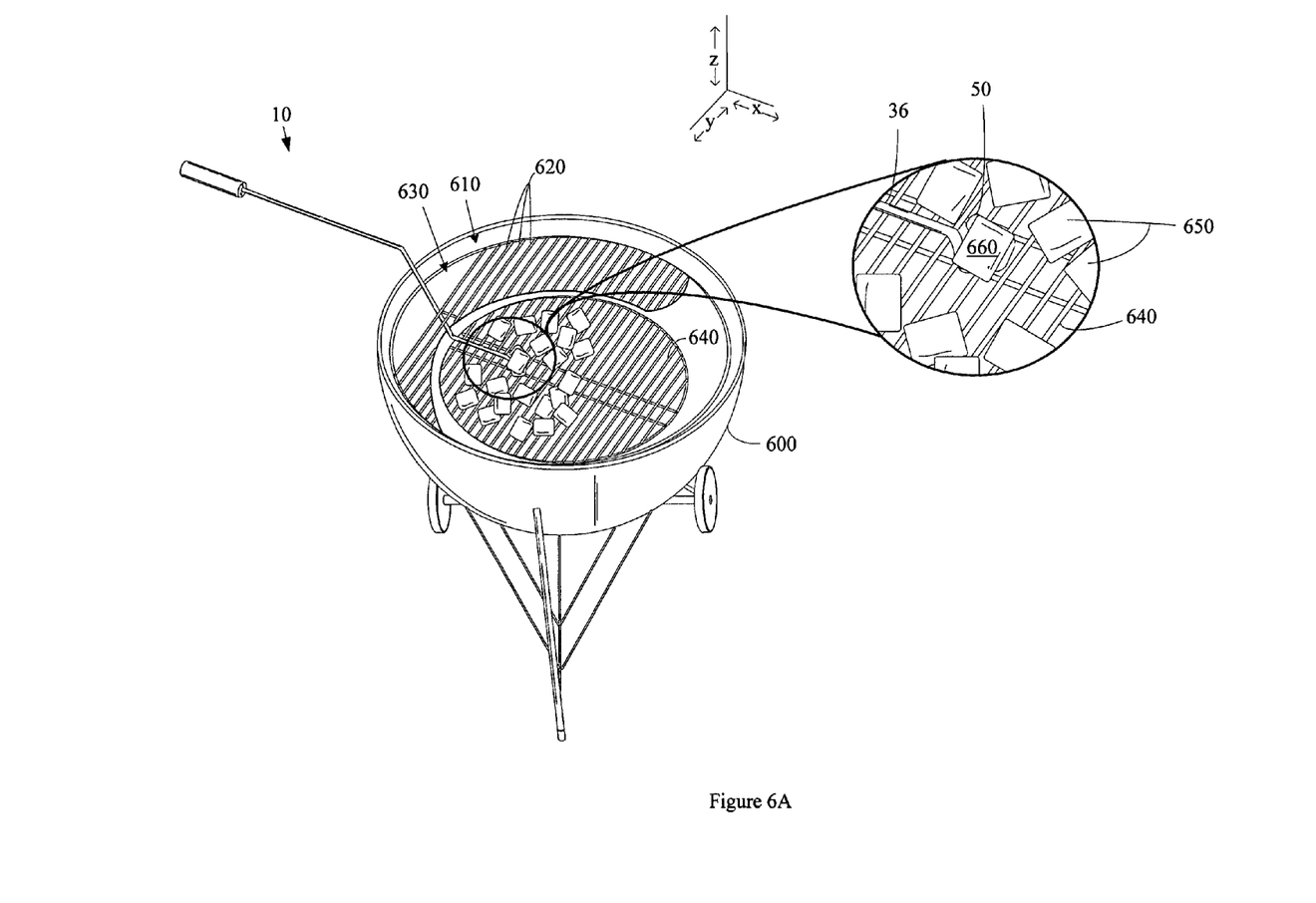
FIGS. 6A and 6B are perspective views of the barbecue grill implement of FIG. 1 being used in conjunction with a barbecue to relocate charcoal in accordance with embodiments of the invention.
Figure 6B:
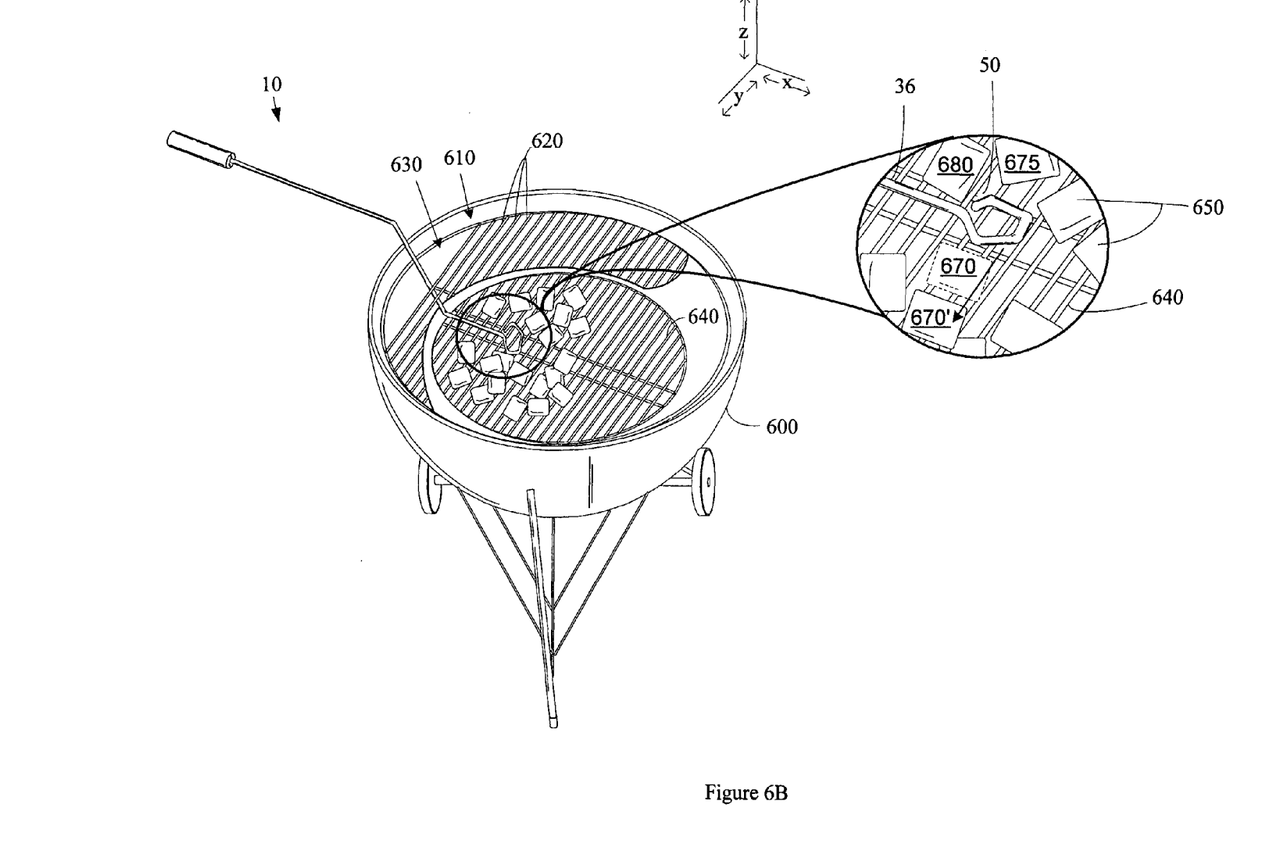

FIG. 5 is a flowchart illustrating operation of the barbecue grill implement 10 of FIG. 1, in accordance with an embodiment of the invention. FIG. 6A is a perspective view of the barbecue grill implement 10 used to relocate a charcoal by lifting the charcoal, in accordance with an embodiment of the invention. FIG. 6B is a perspective view of the barbecue grill implement 10 used to relocate a charcoal by pushing or sweeping the charcoal, in accordance with an embodiment of the invention. FIGS. 6A and 6B include cut-away portions, and expanded portions, as will be discussed below.

The flowchart of FIG. 5 will be discussed in conjunction with the views of FIGS. 6A and 6B. Elements of FIGS. 1-3, 6A, and 6B having common reference numbers are the same, and will not be discussed in detail.

As shown at FIG. 5 at 510, the barbecue grill implement 10 may be inserted into a grill, for example, the grill 600 of FIGS. 6A and 6B. As seen in FIGS. 6A and 6B, the grill 600 may include a cooking grate 610, the cooking grate having a plurality of ribs 620, and typically including a cooking grate opening 630 that may be used in adding charcoal to the grill. A charcoal grate 640 is shown with charcoal, here charcoal briquettes 650.

The cooking grate 610 is cut-away in FIGS. 6A and 6B to allow easier viewing of the charcoal grate 640. Expanded views are provided at FIGS. 6A and 6B to more clearly illustrate the capture and relocation of charcoal by the barbecue grill implement 10. Food items that would be placed on the cooking grate 610 have been omitted for simplicity purposes.

The inserting 510 may be accomplished by a user of the barbecue grill implement 10 placing the raking head 50 into the grill 600. In a further embodiment where the cooking grate 610 is in place on the barbecue grill, the inserting 510 may be accomplished through the opening 630 in the cooking grate 610. One skilled in the art will realize that where the opening 630 is not provided, the user may instead place the raking head 50 between any of the plurality of ribs 620.

As shown at 520, the barbecue grill implement is moved, and at 530, charcoal is captured at the raking head 50. This may be accomplished, for example, by a user moving the grill implement 10 in one or more of the directions indicated at 'x' and 'y' of FIGS. 6A and 6B, along the charcoal grate 640, until the raking head 50 is located at a desired location. The user may then slide the raking head under the selected charcoal to capture 530 the charcoal, for example, a charcoal 660 of FIG. 6A. In the alternative, the user may capture 530 a charcoal by locating the raking head directly adjacent a desired charcoal, for example, charcoals 670, 675 or 680 of FIG. 6B.

As shown at FIG. 540, the user may then relocate the captured charcoal. For example, the user may move the barbecue grill implement 10 in any of the directions 'x', 'y' or 'z' to move the captured charcoal to a different location on the charcoal grate 640. Thus, where the charcoal was captured 530 by sliding or otherwise maneuvering the raking head 50 beneath the charcoal, for example, charcoal 660 of FIG. 6A, the charcoal 660 may be moved to a different location on the charcoal grate 640 and deposited back to the charcoal grate. Where the charcoal was captured 530 by locating the raking head 50 adjacent the charcoal, for example, charcoal 670 of FIG. 6B, the charcoal may be relocated by contacting the charcoal 670 and pushing, or sweeping, the charcoal. For example, the charcoal 670 may be relocated 540 by pushing or sweeping the charcoal in the general 'x' direction to its new location denoted as charcoal 670' of FIG. 6B.

The handle 20 has been disclosed as having a substantially circular cross-section. One skilled in the art will realize that the handle 20 may have other cross-sections, including but not limited to rectangular, square, or hexagonal. Further, though not shown, the handle may include other aspects, contours, curves, indentations, etc., whether on the bottom, top, and/or sides of the handle portion. Further, the handle end opposite the extension portion 30 may be squared or rounded as desired.

Extension portion 30 and raking head 50 have been disclosed as being made from stainless steel No. 304 rod. One skilled will realize that other materials may be utilized. For example, the extension portion 30 and/or raking head 50 may be made from other steel, black iron, or other metals or metal alloys having sufficient heat resistance. Further, the extension portion 30 and raking head 50 may be formed from metal rod or tubing, or may be formed from metal bar stock or metal channel.

Though the extension portion 30 and raking head 50 have been disclosed as being formed from the same piece of stainless steel metal rod, one skilled in the art will realize that other implementations are possible. For example, one or more of the first, second or third extension sections 32, 34 or 36 may be a separate piece of material, where the extension portion is welded, screwed, pressed, or otherwise joined together. The bends 33 and 35 may thus be provided through the joining process.

Similarly, the raking head 50 may be formed from several pieces of material such as metal rod segments joined together by weld, screw joint or other joining, to form the raking head 50. Further, the raking head 50 may be formed from a different piece of material than the extension portion, where the raking head is joined with the extension portion via a weld, screw joint, or other joining.

The dimensions discussed above are exemplary, and others may be utilized. Thus the handle 20, extension portion 30, extension segments 32, 34, 36, the bends 33, 35, and raking head 50 side length may have different lengths, thicknesses, heights, and join at different angles than discussed above while still retaining at least some of the advantages discussed herein. Further, though the extension portion 30 and raking head 50 are disclosed as being formed from ⅜ inch diameter stainless steel rod, other diameters may be utilized while still achieving at least some advantages discussed herein.

The bend angles 'a' and 'b' of the extension portion 30 have been described as being substantially the same angle in opposing directions. One skilled in the art will realize that other bend angles may be utilized. For example, bend angle 'a' and 'b' may each be in the range of 45 degrees to 95 degrees, while still achieving at least some of the advantages disclosed herein. Further, one skilled will realize that angles 'a' and 'b' may be a different degree of bend in substantially opposing directions. Thus, though not shown, angle 'a' may be at 90 degrees, while angle 'b' may be at 75 degrees in the opposite direction while still achieving at least some of the advantages discussed herein.

Where the bend angles 'a' and 'b' are as described above with respect to FIGS. 1-3, at opposing 60 degree angles, the barbecue grill implement 10 follows the contour of most kettle-style barbecue grills. This helps the barbecue grill implement 10 to be inserted within the grill and moved beneath the cooking grate to capture and relocate charcoal along the charcoal grate. It will be appreciated that other angles may be utilized for 'a' and 'b' to accommodate other grill contours, or other grill types, for example, rectangular-shaped barbecue grills.

Thus, a barbecue grill implement and method is provided. The extension portion with two bends in opposing directions allows a user to insert and use the implement from the side of the barbecue, rather than from above the barbecue where the heat emanates. Thus, the user is protected from the potentially dangerous heat emanating from the barbecue. Further, the two bends allows the user an extended reach under the cooking grate of the barbecue, allowing the capturing and relocation of charcoal without the necessity of removing the cooking grate, thereby reducing the chance of displacing food or dropping food on the ground. Such capture and relocating of charcoal allows a user to conveniently move hot charcoal embers along the charcoal grate to vary the heat pattern of the barbecue, for example, to create an indirect heating zone for the barbecue. Such capture and relocation also allows a user to relocate and mix newly added charcoal briquettes within the hot charcoal embers resting on the charcoal grate.

The geometric shaped perimeter with substantially central opening provides a structure for charcoal briquettes to be captured and carried on the raking head, while also, or in the alternative, allowing charcoal and charcoal briquettes to be pushed, swept, or otherwise moved along the charcoal grate. Further, the opening may provides in some cases a spot for the charcoal or charcoal briquette to rest as the contour of a charcoal or charcoal briquette may sit at least partially within the opening. Where the charcoal is able to sit at least partially within the opening of the raking head, the chance of dropping the charcoal briquette during the process of relocating may be reduced, that may also reducing the chance of the charcoal becoming broken or otherwise damaged during the relocation.

One skilled in the art will realize that although the barbecue grill implement has been described above as being used for capturing and relocating charcoal while the cooking grate is in place, that the grill implement may also be utilized to capture and relocate charcoal while the cooking grate is removed. For example, when beginning the process of grilling, with the cooking grate removed, charcoal may be stacked in the middle of the charcoal grate. The charcoal is ignited and allowed to heat up (i.e., turn white). Upon heating up, the barbecue grill implement may be utilized as disclosed herein to capture and relocate charcoal, for example, spreading the pile of hot charcoal embers across the charcoal grate, while the cooking grate is removed. In addition to being able to push or sweep the charcoal across the charcoal grate, the barbecue grill implement is able to slip beneath the charcoal to lift and relocate the heated charcoal or charcoal embers. The lifted charcoal may at least partially rest within the opening of the raking head. Thus, such capture and relocating may be accomplished while reducing a chance of dropping the charcoal that could break or otherwise damage the charcoal.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

I claim:

1. A barbecue grill implement comprising:
   a handle;
   an extension portion coupled with the handle, and including
      a first bend, and
      a second bend in the opposite direction of the first bend; and
   a raking head coupled with the extension portion, the raking head having a pentagon-shaped perimeter with substantially central opening.

2. The barbecue grill implement of claim 1, where the extension portion and the raking head are formed from metal rod.

3. The barbecue grill implement of claim 2, where the extension portion and the raking head are formed from a single piece of metal rod.

4. The barbecue grill implement of claim 1, where the raking head having a pentagon-shaped perimeter includes the raking head having a discontinuous pentagon-shaped perimeter.

5. The barbecue grill implement of claim 1, where the first bend has a first bend angle and the second bend has a second bend angle, and where the extension portion having a second bend in the opposite direction of the first bend includes the second bend angle being substantially the same as but in the opposite direction as the first bend angle.

6. A barbecue grill implement comprising:
   a handle;
   an extension portion coupled with the handle, having a first bend of at least forty-five degrees, and a second bend of at least forty-five degrees in an opposite direction of the first bend; and
   a raking head coupled with the extension portion at an end opposite the handle, the raking head having a geometric perimeter with a substantially central opening; and
   wherein the extension portion includes
      a first extension portion segment between the handle and the first bend and having a length 'l1',
      a second extension portion segment between the first bend and the second bend and having a length 'l2', and
      a third extension portion segment between the second bend and the raking head, and having a length 'l3',
   and where 'l1' is greater than each of 'l2' and 'l3'.

7. The barbecue grill implement of claim 6, wherein the Extension portion and the raking head are formed from a single piece of metal rod.

8. The barbecue grill implement of claim 6, where the raking head having a geometric perimeter includes the raking head having a polygon perimeter.

9. The barbecue grill implement of claim 6, where the raking head having a geometric perimeter includes the raking head having a circular perimeter.

10. The barbecue grill implement of claim 6, where the raking head having a geometric perimeter includes the raking head having a discontinuous geometric perimeter.

11. The barbecue grill implement of claim 6, where 'l2' is greater than 'l3'.

12. The barbeque grill implement of claim 6, where the third extension portion segment is substantially parallel with the first extension portion segment.

13. A method of spreading charcoal in a barbecue, the barbecue having a charcoal grate, and charcoal resting on the charcoal grate, comprising:
   inserting a barbeque grill implement into the barbecue, the barbecue grill implement having a handle, an extension portion coupled with the handle and a raking head coupled with the extension portion, the extension portion including a first bend of at least forty-five degrees, and a second bend of at least forty-five degrees in the opposite direction of the first bend, where the extension portion includes a first extension portion segment between the handle and the first bend and having a length 'l1', a second extension portion segment between the first bend and the second bend and having a length 'l2', and a third extension portion segment between the second bend and the raking head and having a length 'l3', where 'l1' is greater than each of 'l2' and 'l3', the raking head having a geometric perimeter with a substantially central opening;

moving the barbecue grill implement along the charcoal grate;

capturing charcoal at the raking head; and relocating the charcoal on the charcoal grate.

14. The method of claim 13, where the barbecue includes a cooking grate suspended over the charcoal, and where the inserting a barbecue grill implement includes inserting the barbecue grill implement through an opening in the cooking grate.

15. The method of claim 13, where the barbecue includes a cooking grate suspended over the charcoal, and where the moving the barbecue grill implement along the charcoal grate includes moving at least the third extension portion segment of the barbecue grill implement beneath the cooking grate.

* * * * *